(12) United States Patent
Wolzien (10) Patent No.: US 8,767,031 B2
(45) Date of Patent: Jul. 1, 2014

(54) VIDEO CALL CENTER

(75) Inventor: Thomas R. Wolzien, Grandview-On-Hudson, NY (US)

(73) Assignee: Wolzien LLC, Grand View-on-Hudson, NY (US)

( * ) Notice: Subject to any disclaimer, the term of this patent is extended or adjusted under 35 U.S.C. 154(b) by 0 days.

(21) Appl. No.: 13/589,643

(22) Filed: Aug. 20, 2012

(65) Prior Publication Data
US 2014/0049556 A1 Feb. 20, 2014

(51) Int. Cl.
*H04N 7/14* (2006.01)

(52) U.S. Cl.
USPC .......................................... 348/14.01; 725/32

(58) Field of Classification Search
USPC ........... 725/25, 23, 39, 106; 348/14.01–14.08
See application file for complete search history.

(56) References Cited

U.S. PATENT DOCUMENTS

| | | | | |
|---|---|---|---|---|
| 6,034,739 | A * | 3/2000 | Rohlfing et al. .............. | 348/586 |
| 6,201,859 | B1 | 3/2001 | Memhard et al. | |
| 6,272,127 | B1 | 8/2001 | Golden et al. | |
| 7,895,087 | B1 * | 2/2011 | Gottlieb ....................... | 705/26.3 |
| 2006/0041921 | A1 * | 2/2006 | Hane ............................. | 725/117 |
| 2007/0288978 | A1 * | 12/2007 | Pizzurro et al. ............... | 725/112 |
| 2009/0010402 | A1 | 1/2009 | Heimbecher | |
| 2009/0027482 | A1 * | 1/2009 | Emig et al. ................. | 348/14.02 |
| 2010/0226288 | A1 * | 9/2010 | Scott et al. .................... | 370/260 |
| 2013/0019259 | A1 * | 1/2013 | Pizzurro et al. ................. | 725/23 |
| 2013/0050260 | A1 * | 2/2013 | Reitan ........................... | 345/633 |

FOREIGN PATENT DOCUMENTS

| | | |
|---|---|---|
| WO | 01/47262 A2 | 6/2001 |
| WO | 03/053034 A1 | 6/2003 |

OTHER PUBLICATIONS

International Search Report dated Nov. 15, 2013 for PCT/US2013/054924.
"9NEWSAUSTRALIA. Inside the Control Room During TCN 6PM 9 News." Part 1. 2010. URL: http://www.youtube.com/watch?v=JVsg23FzGOo. Entire document.
"CollabraCam: Live multicamera switching on your iPhone or iPad." Jan. 4, 2012. URL: http://www.fcp.co/hardware-and-software/consumer/388-collabracam-live-multicamera-switching-on-your-iphone-or-ipad. Entire document.

* cited by examiner

*Primary Examiner* — Maria El-Zoobi
(74) *Attorney, Agent, or Firm* — Steptoe & Johnson LLP (57) ABSTRACT

A video call center process and system can create cost effective video programs for television transmission from a multiplicity of simultaneous video callers with much less supporting staff.

35 Claims, 7 Drawing Sheets

VIDEO CALL CENTER

TECHNICAL FIELD

This invention relates to a process and system for production of video program incorporating multiplicity of internet video calls and associated conferencing device.

BACKGROUND

The advent of inexpensive video telephony via services/software such as Skype opens the potential for video versions of caller-based talk radio. Video telephony has been used on television news and interview programs for a limited number of interviews, but programs with many viewers calling into the show have not been prevalent to date due to issues of cost benefits related to production and technical complexities and revenue limitations from audiences fractionalized by increased viewing options for the audience.

Commercial video programming is economically successful when revenues exceed program costs, but as the number of video outlets has increased, audiences have fractionalized, often reducing available revenues. As a result, many content services are under cost pressure, cannot afford to produce original content on a regular basis, and are relegated to re-running recorded content that has previously aired, such content having diminishing returns with the advent of alternate viewing options and digital video recorders. This is particularly true among secondary and tertiary cable networks and local television stations during daytime periods, and some operations in prime viewing periods as well. Original live program is generally cost prohibitive for such outlets.

A major component of program costs are those that occur in the live production of the program, including the costs of technical equipment, acquisition of content from remote locations, and personnel. The number of technical and production personnel is often directly related to the complexity of the production coupled with the broader operation of studios and control rooms designed for general use and therefore requiring a high level of minimum staffing regardless of program type. Often a basic studio for live production at a television network requires a minimal technical crew of a technical director (who switches from a multiplicity of video inputs), an audio engineer, and a character generator operator responsible for creating and inserting into the video stream various names and titles. In addition, a production staff is necessary, including a producer, and various production assistants to make certain that such things as appropriate names are provided to the character generator operator. Personnel costs for staffing a single television studio for a single shift for a year can cost more than one half million dollars, before payments to the on-air talent. In contrast, radio production requires far fewer personnel because the on-air talent often also runs the control "board" him/herself, and there is no need for a separate audio person, technical director, or character generator operator. In the case of the talk radio format, a producer often works with the on-air talent to pre-screen and coordinate incoming audio calls from the general public.

SUMMARY

A video call-in television system can include two or more video call central processing units for connecting a plurality of video calls from different callers via the internet, a video converter that converts video generated by the video call central processing units into video formats acceptable for traditional television production devices, a selection module used by an on-air talent for selecting at least one video call to be aired, and an encoding unit for preparing the video call signal for transmission live to a video distributor. Television can include over air broadcast, video streaming, or combinations thereof. Broadcasting, transmitting or connecting via the internet can include transmission of data by wireless or wired technology, including cellular, mobile, satellite, wifi, microwave or other mode, or combinations thereof.

In one aspect, each video call central processing unit is dedicated to a video call. Each video call central processing unit is for making and receiving a video call.

In another aspect, each video call central processing unit determines a video call's size and position on a computer screen and a video converter extracts and converts the video call to a video signal usable in a live television production.

In another aspect, each video call central processing unit generates a text identification or Video Call Text Overlay for a caller, positions such text identification over the video call, and the video converter converts the video call to a video signal usable in live television with the text now integrated with the video call. Each video call central processing unit prepares the text identifications for storage in a database with other call characteristics. In one aspect, the text identification can be generated manually. In another aspect, the text identification can be generated automatically.

In another aspect, each video call central processing unit prepares the text identifications for storage in a database with other call characteristics. Each video call central processing unit collects an imbedded information about the video call and prepares such information for storage in a database with other call characteristics. Each video call central processing unit permits an entry of producer notes in real time both in preparation for storage in a database and a separate display for the on-air talent.

In another aspect, each video call central processing unit communicates with and stores information in a database run through a different video call central processing unit. Each video call central processing unit permits displaying information previously stored in a distant data base.

In another aspect, the video call-in television system can include a television video converter, wherein the television video converter takes a selected portion of the video through a standard computer video output and converts the video into a signal usable by normal television production equipment. Such video converter may be a standalone device or a specialized converter card housed within the case of the call computer.

In another aspect, the video call-in television system can include a television video mixing module, wherein the television video mixing module permits a selection of various television video picture generated from the separate video calls.

In another aspect, the selection module can include a touch screen display selection apparatus used by the on-air talent to select at least one video call to be aired.

In another aspect, the video call-in television system can include a specialized audio mixer for providing discrete audio returns to each video call central processing unit and hence to an individual caller so that all the callers can hear each other and the on-air talent.

In another aspect, the video call-in television system can include a separate video call central processing unit for a video call database and optional producer central control to the video call central processing units.

In another aspect, the video call-in television system can include an information display module for the on-air talent containing text messages from a producer regarding topics or characteristics of the callers and other information necessary for coordinating a television program. The video call-in television system can include at least one video camera photographing the on-air talent.

In another aspect, the selection module can include an ergonomically designed conference controller that permits the on-air talent to add the individual audio of multiple callers when desired, restore the audio system to a single caller as needed, or stop the audio of all callers if necessary.

In another aspect, the video call-in television system can include a producer control module that has an ability to monitor and control video calls on the video call central processing units.

In another aspect, a video call-in television broadcasting process can include receiving and screening a plurality of separate video calls from different callers via the internet, deciding and entering a text identification, such as a Video Call Text Overlay, for each video call and caller, and selecting at least one video call to be aired by an on-air talent from a plurality of calls.

In another aspect, the video call-in television broadcasting process can include generating and displaying pictures of available callers and their text identification or Video Call Text Overlay on a touch screen for the on-air talent.

In another aspect, the video call-in television broadcasting process can include switching the on-air video caller by the on-air talent. The on-air talent switches the on-air video caller by tapping the caller's picture on the touch screen.

In another aspect, the video call-in television broadcasting process can include contacting each caller when a video call is received. The text identification or Video Call Text Overlay is entered in an on-screen box.

In another aspect, the video call-in television broadcasting process can include extracting a caller's information. The video call-in television broadcasting process can include generating the text identification or Video Call Text Overlay from the extracted caller's information.

In another aspect, the video call-in television broadcasting process can include monitoring the video call selection and the entry of text identification or Video Call Text Overlay by a producer on a separate display.

In another aspect, the video call-in television broadcasting process can include generating a television video from the video call signal for transmission live to a video distributor. The video call-in television broadcasting process can include entering a text input prior to generating a television video from the video call signal for transmission live to a video distributor. The video call-in television broadcasting process can include controlling the positions of the text input and the text identification or Video Call Text Overlay prior to generating television video. The positions of the text input and the text identification or Video Call Text Overlay on computer screens prior to the generation of television video can be different.

The term "television video" includes any form of video signal used within the technical aspects of traditional live television production, including analog, digital, component, composite, and SDI, including video signals of those types after conversion from computer based video outputs such as DVI, HDMI, and VGA, but excludes video processing within a conventional computer that produces normal computer video monitor outputs such as DVI, HDMI, and VGA. In the context of television video, the terms "convert", "converts", or "converting" video into television video are synonymous with the terms "generate", "generates", or "generating" television video.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

DETAILED DESCRIPTION

A video call center process and system can create cost effective video programs for television transmission from a multiplicity of simultaneous video callers. Related Video Call Text Overlays can aid in tracking and identifying on air the multiplicity of simultaneous callers. The on-air talent can do the video mixing of selected callers with a touch screen. Related audio switching and conferencing of video callers can be done by a specialized switching control device.

The video call center process and system can efficiently permit development of call-in video programs that work with the low level economics available in relatively small-audiences available to today's fragmented video distribution. The production of live video call-in programs can operate with as few as two people, including a producer and on-air talent as seen in talk radio.

The producer screens and coordinates incoming separate internet video calls and inserts textual information (i.e.: "Bill, Chicago") into the computer video display for each call, thus providing the on-air talent with the information immediately necessary to put a video call on the air. In some embodiments, the text can be inserted before the computer video is converted to television video.

The on-air talent can physically select the calls that will be aired via a touch screen and specialized audio switching equipment. With the imbedded textual information in the picture, the on-air talent can, with no other information, tap the touch screen and smoothly transition to the new caller (i.e.: "Bill's up on the line now, Hi Bill. What's up in Chicago?")

Figure 1:
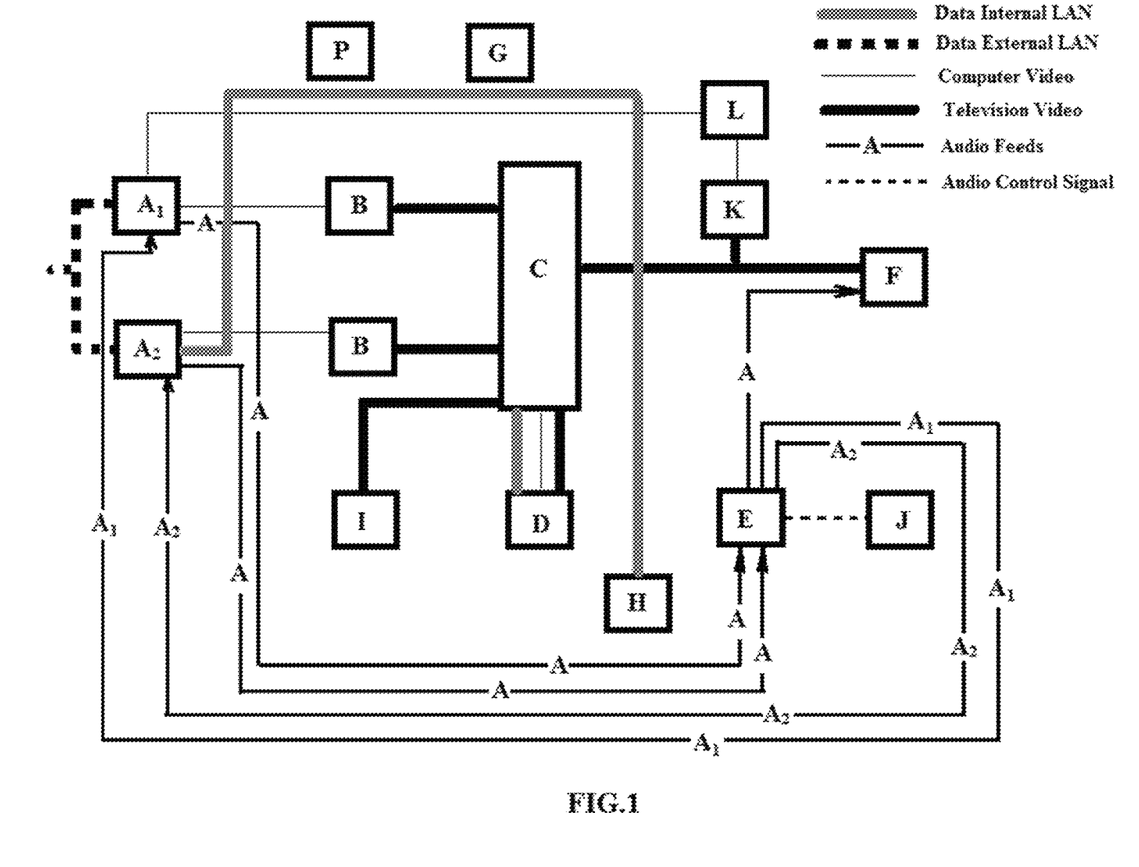
FIG. 1 is a schematic diagram depicting a video call center system.

The system can have a plurality of major components. As shown in FIG. 1, Block A can be two or more Video Call Central Processing Units (Video Call CPU) (hereinafter to include a virtual machine performing the necessary functions of the Video Call CPU) which can perform the following actions in real time for each video caller:

a) making or receiving the video call (with associated audio) via the internet,
b) generating selected text identifications or Video Call Text Overlay for the caller (i.e.: Bill, Chicago) and positioning such text over the call video from manual or automatic entry,
c) selecting the video sizes and positions on the screen prior to the call video with text being converted to a video signal usable in live television production,
d) collecting imbedded information about the video call and preparing such information for storage in a database with other call characteristics,
e) preparing selected text identifications from b (above) for storage in a database with other call characteristics,
f) permitting entry of producer notes in real time both in preparation for storage in a database and a separate display for talent,
g) storing all information in a local database,
h) communicating with and stores information in a database run through a different central processing unit,
i) displaying information previously stored in a local or distant data base,
j) returning audio to the caller, and
k) returning video to the caller.

In some embodiments, a Call CPU performing the above-mentioned functions can be dedicated to each separate caller that is on-air or is being prepared for air. The number of Call CPUs is variable depending on the number of calls that are desired to be in the screening process and standing by in queue for a particular on-air application.

Block B is a Television Video Converter which takes a selected portion of the video through the standard computer video output (such as DVI or VGA) of the CPU/Block A (including the Call Text Overlay) and converts the video into a television video signal usable by normal television production equipment, such as video via a Serial Digital Interface (SDI). The Video Converter may be a stand-alone device, or be included within the container of the Video Call CPU as an additional process or board. In the preferred embodiment, a Television Video Converter will be dedicated to each CPU, however various video call feeds may be preselected through sub-switches for processing by a single Television Video Converter. This will limit the number of call options available to the on-air talent, but will reduce the number of Television Video Converters necessary.

Block C is a television video mixing apparatus which permits selection of various television pictures from the multiplicity of Call CPUs and related Television Video Converter sources, or from other video sources necessary to production. The video output of Block C goes to Block F for preparation for transmission and also returns directly to each Video Call CPU (after being converted back into video format acceptable to computers) or by way of a text generation system to provide to the caller both the picture currently on the air plus textual information to the caller.

Block D is a Touch Screen Display selection apparatus used by the on-air talent to select the next caller to air from the multiplicity of callers provided through Blocks A and B as made available through Block C. The video in the multiple boxes in the touch screen are from each awaiting caller, and each such caller's video contains the Call Text Overlay identifier (Bill, Chicago) from Block A(c).

Block E is a specialized audio mixer capable of providing discrete audio returns to each Video Call CPU (and thence to the individual caller) so that all callers can hear each other and the talent, but not themselves. This is necessary due to the various processing and transmission delays in internet video calling which could result in a significant, and very confusing, delay in the callers voice returning to him/her. Such discrete return audio feeds are known in the trade as an audio matrix or "mixed minus."

Block F is the encoding process/unit to prepare the final audio and video signal for transmission live to a video distributor. In an alternative embodiment, Block F is incorporated at the output stage of a video mixing device, Block C.

Block G is a separate CPU for the Video Call Database and optional Producer Central Control to the Video Call CPUs.

Block H is the Information Screen for the Talent containing text messages from the producer regarding topics or characteristics of the callers and other information necessary for coordinating a television program. Such messages may also incorporate caller information retrieved from the Video Call Database, Block G.

Block I are one or more video cameras photographing the on-air talent, or other video sources related to the program then being produced.

Block J is a specialized, ergonomically designed conference mixer-controller that permits the talent to add audio of multiple callers when desired, restore the audio system to a single caller as needed, or stop all the audio if necessary. Block E can have a series of relays before the audio mixer to control on and off of the audio signals. In some embodiments, by sending an audio control signal, the on-air talent's controller (Block J) can be designed to drive the series of relays (via various scripts on an audio control computer) that open or break the audio prior to the audio mixer. The audio control signals that relays receive can be serial/RS232 or USB control data from the audio control computer. Thus, the switching the audio on and off can be done before the mixer.

Block K converts Television Video output of Block C, the video mixer into video that can be processed by a computer.

Block L generates and adds text message overlays to the video from Block K to be returned to all Video Call CPUs and hence as return-video to the caller. In some embodiments, a process for the video return to the caller can include converting the television video to analog, inserting the text, and converting the combined image to computer video for return transmission to the callers.

Block P is the Producer Control Point which includes the ability to monitor and control video calls on the Video Call CPUs either directly, or via an optional control CPU, including the entry of Caller Text Overlays and continuous video monitoring of video output (including Caller Text Overlay) from the Video Call CPU or from the Television Video Converter if it is dedicated to each Video Call CPU. Incoming audio is monitored and return audio can be interrupted by the producer to communicate with each caller.

Figure 2:
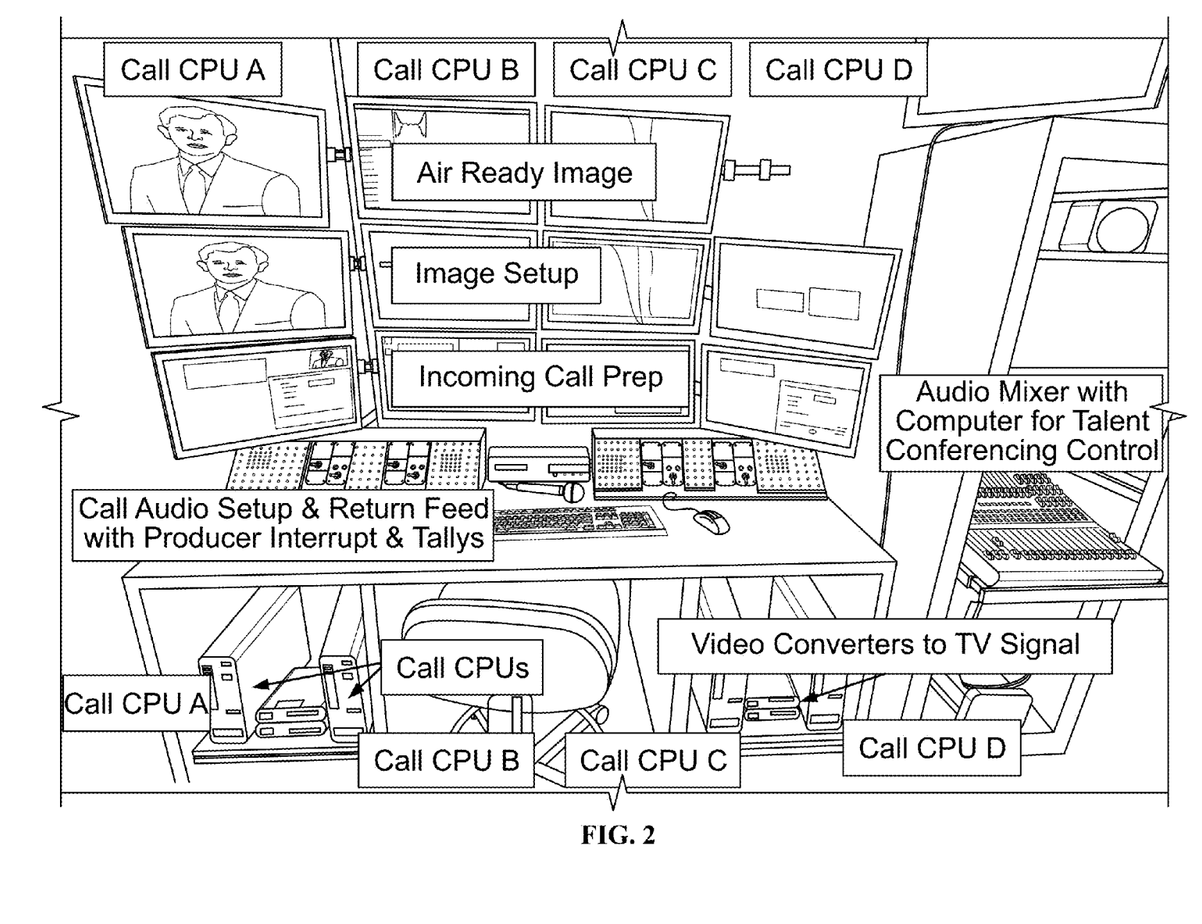
FIG. 2 is a figure depicting a video call center system.

An embodiment of an installed video call center system is shown in FIG. 2.

Figure 3:
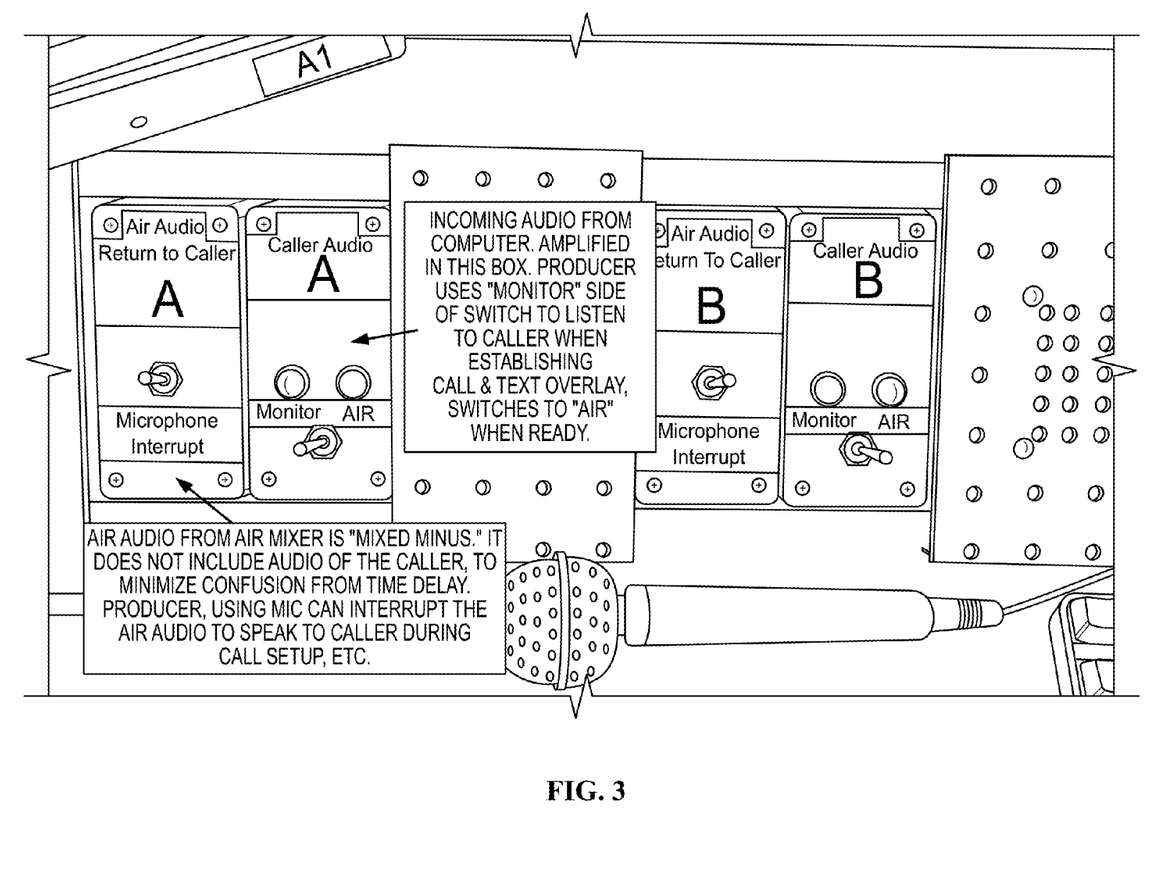
FIG. 3 is a figure depicting a video call center system.

As shown in FIG. 1, when on the air, the TV Video Call System is intended to be operated by two people: a producer and the on-camera talent. The producer at Block P, the Producer Control Point (shown in FIG. 3), screens incoming calls, decides on and enters the Caller Text Overlay (Bill, Chicago), and enters topics and other notes for the talent to see on the display shown in Block H. Incoming audio from computer can be amplified. Producer uses "monitor" side of a switch to listen to caller when establishing call & text overlay. The producer can switch to "Air" when ready.

Figure 4:
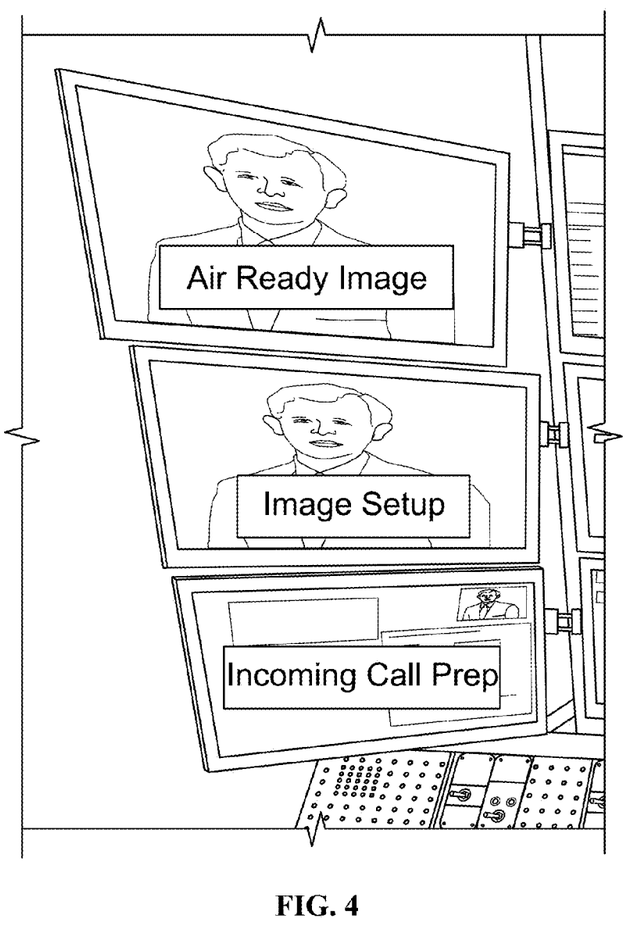
FIG. 4 is a figure depicting a video call center system.

In some embodiments, as shown in FIG. 4, the process can be:

1) when call is received, the producer enters city and caller name in the text entry box. The producer can also include topic, or any other relevant info that fits ("Incoming Call Prep" in FIG. 4).
2) Caller info is immediately displayed in a predetermined position and font (with drop shadow option) on the incoming caller picture ("Image Setup" in FIG. 4).
3) Picture is cropped and converted to Television Video. With Caller Info always part of the picture, any question of who caller is can be eliminated in a fast paced show. Further, supporting staff to assure subsequent accurate entry to talent and text is unnecessary. (FIG. 4 "Air Ready Image")

As shown in FIG. 1, the on-air talent sees the pictures of available callers and Video Caller Text Overlay on his/her touch screen, and selects the next desired video caller for air by tapping the picture of the desired caller. That caller is now on the air. By selecting audio from additional callers through Block J, the specialized audio conference mixer-controller, the on-air talent can allow multiple separate callers to participate in a conversation on air, while the on-air talent independently selects from the multiplicity of video pictures of the participating callers. The on-air talent neutralizes the conference when ready to move on to the next video caller. In addition to selection pictures via the touch screen, the talent selection of video pictures can be partially automated through a combination of audio-follow video and voice activated switching methods as allowed by the relays within Block E.

When a video call is received at the Video Call CPU, the Producer in contact with the caller, enters text for the Caller Text Overlay in one part of the screen, such text displaying in a predetermined position over the video caller in the video caller part of the screen(s) of the Video Call CPU. Such text may be entered in an on-screen box specifically designed for the purpose, or entered into a data-base form. In either case, the text appears both in the box/form as it is entered, and over the video of the caller. Caller ID information is extracted from the available call data and is shown on the Producer's control screen as a cell in a database window. Additional pertinent information regarding the caller, legal releases, may be entered by the Producer into a data base form. Topic information and notes for the on-air talent are also entered into the data base form, but such information for the talent is immediately transmitted to the talent's information screen, (H). Caller ID information automatically activates a search of the central data base (G), and any information located is returned to the data base form at the Video Call CPU for use by the Producer in the call screening process. New information entered into the database form at the Video Call CPU is saved into the central database when the call is terminated. Additional pertinent program details such as date, time of air, show name, talent, producer are entered at login and retained within each database entry.

The Video Call Text Overlay eliminates the need for a traditional character generator operator and associated production assistants, while assuring that there is no mix-up in who is calling during a fast paced show. Traditionally, television text is inserted during or after the switching process of the television-type video, which requires coordination between the incoming call and the name attached to the call. In the current embodiment, the text is inserted within the computer handing the incoming call and before the computer video is converted to television video. This assures that the text stays with the caller's picture throughout the process.

The use of the touch-screen caller selection by the on-air talent eliminates the need for a technical director who normally switches pictures of talent in remote video, while letting the on-air talent control the content flow of the program through video touch screen and through the customized audio conferencing unit.

The conference mixer-controller (Block J in FIG. 1) can be ergonomically designed. It can allow the on-air talent to control on-off audio for each caller without looking down from camera, while reducing potential for hitting the wrong button.

Figure 5:
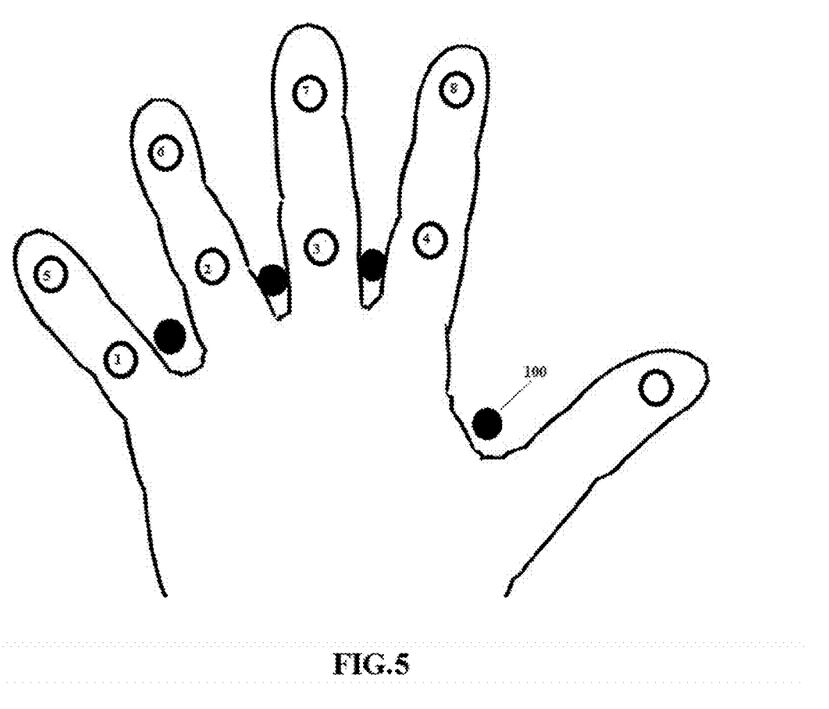
FIG. 5 is a schematic diagram depicting a video call center system.
Figure 6:
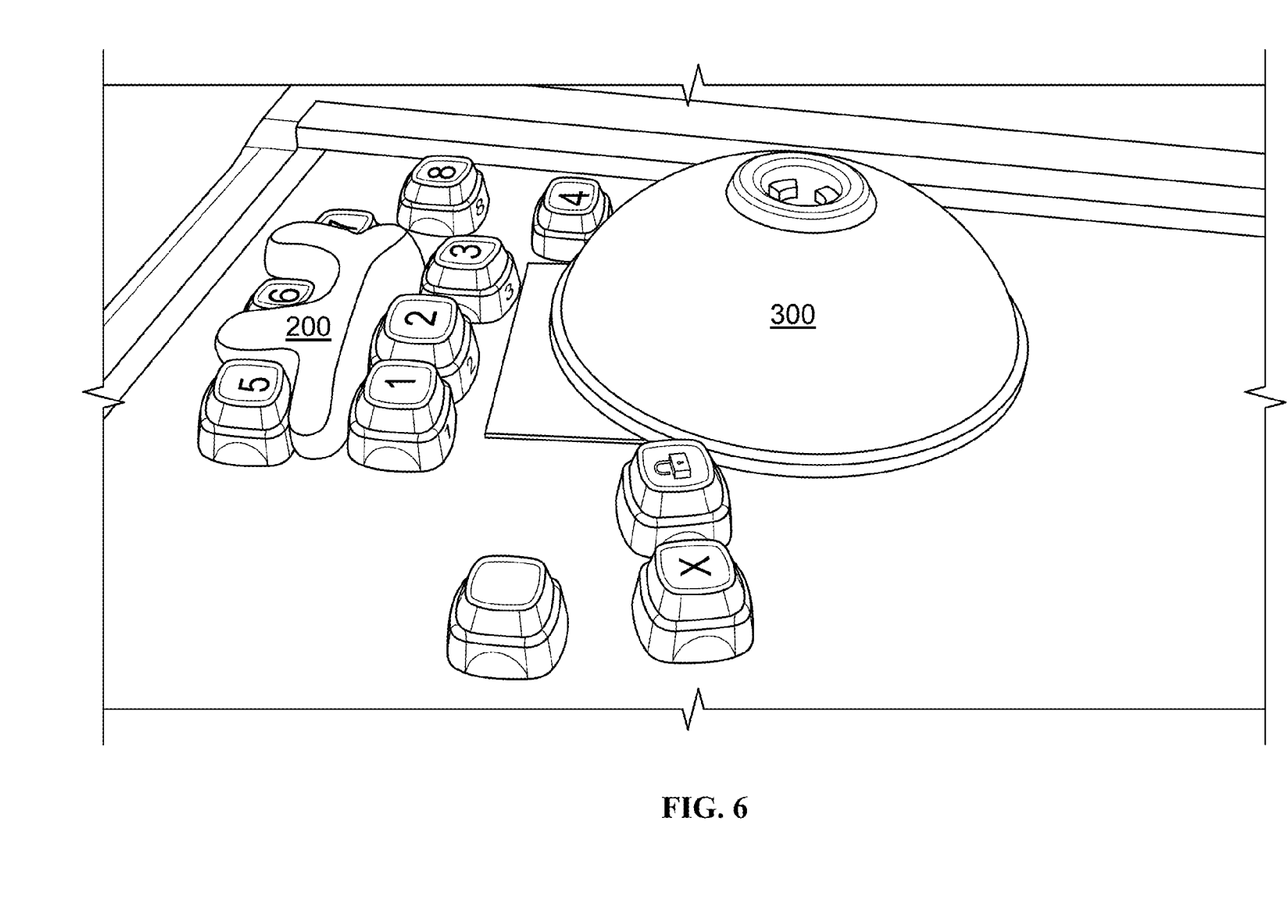
FIG. 6 is a figure depicting a video call center system.

As shown in FIG. 5, keys/buttons can be custom positioned on a commercially available flexible input system that has been modified for comfortable hand position. It can contain a series of switches or switch controls arranged under the fingers of either or both hands, so as the pressing of several selected switches will result in the audio associated with those switches being placed on air individually or in conference. It can have pins 100 between each finger so that the ergonomic design of the switching unit can prevent errors when then hand is placed into the unit while the on-air talent is on air. In other embodiments, as shown in FIG. 6, bridge 200 can be used as a replacement of pins to provide a tactile warning to assure accurate position of index and middle fingers.

Figure 7:
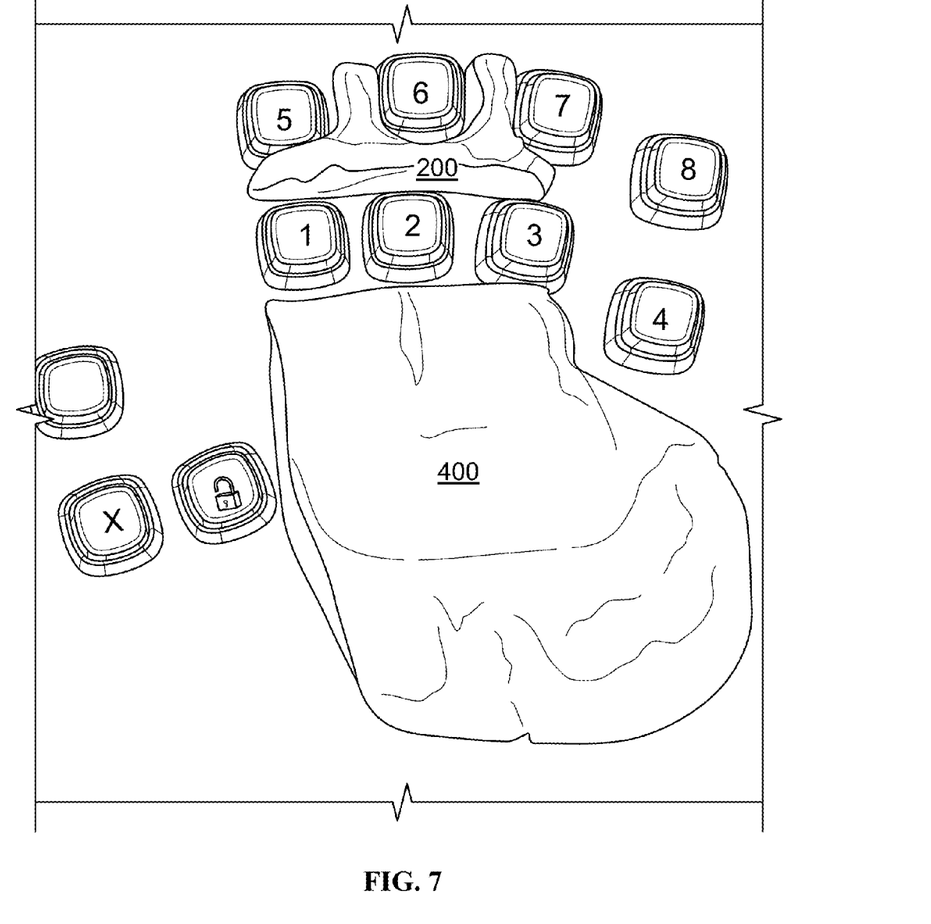
FIG. 7 is a figure depicting a video call center system.

Secondary hardware or software latches and releases via foot pedals and/or under the thumb (shown in FIG. 5) can used to insure that the intended audio switches being added without error, and permit clearing of all non-desired audio. As further shown in FIGS. 5-7, a partial sphere shape (300 in FIG. 6) and a molded negative palm cast (400 in FIG. 7) can be used, separately or in combination to support and assure proper placement of the hand.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims. A number of embodiments of the invention have been described. Nevertheless, it will be understood that various modifications may be made without departing from the spirit and scope of the invention. For example, although an embodiment shows that a Call CPU can be dedicated to each caller, a Call CPU can handle the communication and video/audio transmission of more than one caller, each caller via a separate internet video connection.

Other embodiments are within the scope of the following claims.

What is claimed is:
1. A video call-in television system comprising:
two or more video call central processing units for connecting a plurality of video calls from different callers via the internet, wherein each video call central processing unit is dedicated to a video call;

two or more video converters for converting video from the video call central processing units into television video;

a selection module used by an on-air talent for selecting at least one video call to be aired; and an encoding unit for preparing the video call signal for transmission live to a video distributor for television broadcasting.

2. The video call-in television system of claim 1, wherein each video call central processing unit is for making and receiving a video call.

3. The video call-in television system of claim 1, wherein each video call central processing unit sets a video call's size and position on a computer screen prior to conversion of the video call to a video signal usable in a live television production.

4. The video call-in television system of claim 1, wherein each video call central processing unit generates a text identification or Video Call Text Overlay for a caller, and positions such text identification over the video call, prior to conversion of the video call to a video signal usable in live television with the text now integrated with the video call.

5. The video call-in television system of claim 1, wherein each video call central processing unit prepares the text identifications for storage in a database with other call characteristics.

6. The video call-in television system of claim 4, wherein the text identification can be generated manually.

7. The video call-in television system of claim 4, wherein the text identification can be generated automatically.

8. The video call-in television system of claim 1, wherein each video call central processing unit prepares the text identifications for storage in a database with other call characteristics.

9. The video call-in television system of claim 1, wherein each video call central processing unit collects an imbedded information about the video call and prepares such information for storage in a database with other call characteristics.

10. The video call-in television system of claim 1, wherein each video call central processing unit permits an entry of producer notes in real time both in preparation for storage in a database and a separate display for the on-air talent.

11. The video call-in television system of claim 1, wherein each video call central processing unit communicates with and stores information in a database run through a different video call central processing unit.

12. The video call-in television system of claim 1, wherein each video call central processing unit permits displaying information previously stored in a distant data base.

13. The video call-in television system of claim 1 further comprising a television video converter, wherein the television video converter takes a selected portion of the video through a standard computer video output and converts the video into a signal usable by a normal television production equipment.

14. The video call-in television system of claim 1 further comprising a television video mixing module, wherein the television video mixing module permits a selection of various television videos generated from the video calls.

15. The video call-in television system of claim 1, wherein the selection module comprises a touch screen display selection apparatus used by the on-air talent to select at least one video call to be aired from a plurality of calls.

16. The video call-in television system of claim 1 further comprising a specialized audio mixer for providing discrete audio returns to each video call central processing unit and hence to an individual caller so that all the callers can hear each other and the on-air talent on an audio return, but not themselves.

17. The video call-in television system of claim 1 further comprising a separate video call central processing unit for a video call database and optional producer central control to the video call central processing units.

18. The video call-in television system of claim 1 further comprising an information display module for the on-air talent containing text messages from a producer regarding topics or characteristics of the callers and other information necessary for coordinating a television program.

19. The video call-in television system of claim 1 further comprising at least one video camera photographing the on-air talent.

20. The video call-in television system of claim 1, wherein the selection module comprises an ergonomically designed conference controller that permits the on-air talent to add audio of multiple callers when desired.

21. The video call-in television system of claim 20, wherein the ergonomically designed conference controller further permits the on-air talent to select the audio system to a single caller as needed.

22. The video call-in television system of claim 20, wherein the ergonomically designed conference controller further permits the on-air talent to stop audio from all callers if necessary.

23. The video call-in television system of claim 1 further comprising a producer control module that has an ability to monitor and control video calls on the video call central processing units.

24. A video call-in television broadcasting process comprising:

receiving and screening a plurality of video calls from different callers via the internet, wherein each video call is received by a dedicated video call central processing unit;

deciding and entering a text identification or Video Call Text Overlay for each video call and caller by the dedicated video call central processing unit;

selecting by an on-air talent at least one video call to be aired; and preparing the video call signal for transmission live to a video distributor for television broadcasting.

25. The video call-in television broadcasting process of claim 24 further comprising generating and displaying pictures of available callers and their text identification or Video Call Text Overlay on a touch screen for the on-air talent.

26. The video call-in television broadcasting process of claim 24 further comprising switching the on-air video caller by the on-air talent.

27. The video call-in television broadcasting process of claim 24, wherein the on-air talent switches the on-air video caller by tapping the caller's picture on the touch screen.

28. The video call-in television broadcasting process of claim 24, wherein the text identification or Video Call Text Overlay is entered in an on-screen box.

29. The video call-in television broadcasting process of claim 24 further comprising extracting a caller's information.

30. The video call-in television broadcasting process of claim 29 further comprising generating the text identification or Video Call Text Overlay from the extracted caller's information.

31. The video call-in television broadcasting process of claim 24 further comprising monitoring the video call selection and the entry of text identification or Video Call Text Overlay by a producer on a separate display.

32. The video call-in television broadcasting process of claim 24 further comprising generating television video from the video call signal for transmission live to a video distributor.

33. The video call-in television broadcasting process of claim 32 further comprising entering a text input on the video as received prior to generating television video from the video call signal for transmission live to a video distributor.

34. The video call-in television broadcasting process of claim 32 further comprising controlling the positions of the text input and the text identification or Video Call Text Overlay prior to the generation of television video.

35. The video call-in television broadcasting process of claim 34, wherein the positions of the text input and the text identification or Video Call Text Overlay on the video generated for conversion to television video are different.

* * * * *